(12) United States Patent
Gupta et al.

(10) Patent No.: US 11,282,267 B2
(45) Date of Patent: Mar. 22, 2022

(54) SYSTEM AND METHOD FOR PROVIDING AUTOMATED DATA VISUALIZATION AND MODIFICATION

(71) Applicant: Cognizant Technology Solutions India Pvt. Ltd., Chennai (IN)

(72) Inventors: Shubam Gupta, Jammu (IN); Pooja Gupta, Ludhiana (IN); Siddhartha Das, Bangalore (IN); Nitesh Awasthi, Kanpur (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 17/015,264

(22) Filed: Sep. 9, 2020

(65) Prior Publication Data
US 2022/0005263 A1   Jan. 6, 2022

(30) Foreign Application Priority Data
Jul. 2, 2020 (IN) .............................. 202041028124

(51) Int. Cl.
*G06T 15/50* (2011.01)
*G06F 3/01* (2006.01)
(Continued)

(52) U.S. Cl.
CPC .............. *G06T 15/50* (2013.01); *G06F 3/017* (2013.01); *G06K 9/66* (2013.01); *G06T 19/006* (2013.01);
(Continued)

(58) Field of Classification Search
CPC .......... G06T 15/50; G06T 19/006; G06K 9/66
(Continued)

(56) References Cited

U.S. PATENT DOCUMENTS 8,605,941 B2   12/2013   Clarkson
9,384,594 B2   7/2016   Maciocci
(Continued)

OTHER PUBLICATIONS

Ekaterina Olshannikova, "Visualizing Big Data with augmented and virtual reality: challenges and research agenda", Journal of Big Data (2015) 2:22, p. 1-27.

*Primary Examiner* — Thomas J Lett
(74) *Attorney, Agent, or Firm* — Cantor Colburn LLP

(57) ABSTRACT

A system and method for automated data visualization and modification of visualized data is disclosed. The present invention provides for identifying data points and data types associated with the selected data. Further, one or more visual representations for rendering the selected data are evaluated based on the identified data points and the data types. Yet further, the selected data is optimally visualized based on an identification of a display device type. The present invention further provides for evaluating a theme of visual representations using a real-time lighting information of the real world environment based on identification of the display device type. The selected data is visualized using the evaluated theme of visual representations and the evaluated one or more visual representations. Yet further, the present invention provides for identifying user actions and interpreting inputs from the identified user actions to update or modify visualized data.

28 Claims, 3 Drawing Sheets

(51) Int. Cl.
  *G06T 19/00* (2011.01)
  *G10L 15/16* (2006.01)
  *G10L 15/26* (2006.01)
  *G10L 15/18* (2013.01)
  *G06K 9/66* (2006.01)

(52) U.S. Cl.
  CPC .......... *G10L 15/16* (2013.01); *G10L 15/1822* (2013.01); *G10L 15/26* (2013.01)

(58) Field of Classification Search
  USPC ........................................................ 345/426
  See application file for complete search history.

(56) References Cited

U.S. PATENT DOCUMENTS

| | | | |
|---|---|---|---|
| 9,665,988 B2 | 5/2017 | Djorgovski | |
| 2017/0116373 A1* | 4/2017 | Ginsburg | G16H 40/20 |
| 2018/0053021 A1* | 2/2018 | Rasheed | E04H 13/001 |
| 2019/0235636 A1 | 9/2019 | Marcolina | |
| 2019/0347837 A1* | 11/2019 | Donalek | G06T 17/20 |
| 2019/0394103 A1* | 12/2019 | Korkin | G06T 11/206 |

* cited by examiner

SYSTEM AND METHOD FOR PROVIDING AUTOMATED DATA VISUALIZATION AND MODIFICATION

CROSS REFERENCE TO RELATED APPLICATION

This application is related to and claims the benefit of Indian Patent Application Number 202041028124 filed on Jul. 2, 2020, the contents of which are herein incorporated by reference in their entirety.

FIELD OF THE INVENTION

The present invention relates generally to data visualization. More particularly, the present invention relates to a system and a method for providing automated visualization of multidimensional data, and modification of said visualized data based on an identification of user actions.

BACKGROUND OF THE INVENTION

With the advent of technology and ever-increasing data sources, a large amount of complex multidimensional data is generated in almost all aspects of life including enterprises. With this unprecedented surge in data, data visualization has emerged as a critical technique to extract knowledge from the complex multi-dimensionality data sets. Data visualization in general refers to visual representation of data in the form of graphs, charts, maps, tables etc. to provide easily understandable data insights. As a result of the ease of understanding offered by data visualization, data visualization has become an essential component of any data analysis or data mining process.

Existing techniques of data visualization include manual identification of data points from complex multidimensional data and manual selection of appropriate visual representations to generate comprehendible data patterns. The identification of data points and selection of visual representations is further dependent on the skills of the one or more users involved in the process of visualization. Further, the existing techniques are time consuming, and may lack accuracy due to human intervention.

Furthermore, the existing techniques are dependent on expensive hardware and are therefore inaccessible to the people at large. Yet further, the existing techniques offer limited capability to identify user actions such as hand gestures and voice to modify visualized data. This further restricts user capabilities in real-time, as changes may be made frequently.

In light of the above drawbacks, there is a need for a system and a method which automates data visualization. There is a need for a system and a method which supports modification of visualized data in real-time based on user actions such as hand gestures and voice commands. There is a need for a system and a method which can automatically identify data points and select appropriate visual representations. Further, there is a need for a system and a method which enhances data visualization using machine learning and adjusts visualization based on real-time lighting information. Yet further, there is a need for a method which can be easily integrated with any standard smartphones and virtual reality devices. Yet further, there is a need for a system and a method which is economical, and optimizes storage allocation based on size of data.

SUMMARY OF THE INVENTION

In various embodiments of the present invention, a method for providing automated data visualization and modification of visualized data is disclosed. The method is implemented by at least one processor executing program instructions stored in a memory. The method comprises identifying one or more data points and one or more data types associated with a selected data using data analysis techniques. The method further comprises evaluating one or more visual representations for rendering the selected data based on the one or more data points and the one or more data types using a mapping table generated based on a predetermined set of mapping criteria. Further, the method comprises visualizing the selected data based on the one or more visual representations via a display device based on an identification of a type of the display device using a data rendering technique. Finally, the method comprises analyzing and modifying the visualized data using user actions. The user actions include hand gestures, touch inputs and voice commands, further wherein the user actions are customizable.

In various embodiments of the present invention, a system for providing automated data visualization and modification of visualized data is disclosed. The system interfaces with a display device, and comprises a memory storing program instructions, a processor configured to execute program instructions stored in the memory, and a visualization engine executed by the processor. The system is configured to identify one or more data points and one or more data types associated with a selected data using data analysis techniques. Further, the system is configured to evaluate one or more visual representations for rendering the selected data based on the one or more data points and the one or more data types using a mapping table generated based on a predetermined set of mapping criteria.

Furthermore, the system is configured to visualize the selected data based on the one or more visual representations via the display device based on an identification of a type of the display device using a data rendering technique. Finally, the system is configured to analyze and modify the visualized data using user actions. The user actions include hand gestures, touch inputs and voice commands, further wherein the user actions are customizable.

In various embodiments of the present invention, a computer program product is provided. The computer program product comprises a non-transitory computer-readable medium having computer-readable program code stored thereon, the computer-readable program code comprising instructions that, when executed by a processor, cause the processor to identify one or more data points and one or more data types associated with a selected data using data analysis techniques. Further, one or more visual representations for rendering the selected data are evaluated based on the one or more data points and the one or more data types using a mapping table generated based on a predetermined set of mapping criteria. Furthermore, the selected data is visualized based on the one or more visual representations via the display device based on an identification of a type of the display device using a data rendering technique. Finally, the visualized data is analysed and modified using user actions. The user actions include hand gestures, touch inputs and voice commands, further wherein the user actions are customizable.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for providing automated data visualization and modification of visualized data based on user actions. In particular, the present invention provides for identifying data points and datatypes associated with the selected data by analysing and categorising selected data. Further, one or more visual representations for rendering the selected data are evaluated based on the identified data points and the datatypes. Yet further, the selected data is optimally visualized based on an identification of a display device type. Examples of display devices may include, but are not limited to, virtual reality displays, augmented reality displays, mixed reality displays, smartphones or any other device capable of displaying single or multidimensional data. The present invention further provides for evaluating a theme of visual representations using a real-time lighting information of the real world environment based on identification of the display device type. Further, the selected data is visualized using the evaluated theme of visual representations and the evaluated one or more visual representations. Yet further, the present invention provides for identifying user actions and interpreting inputs from the identified user actions to update or modify visualized data. The user actions may include, but are not limited to, hand gestures and voice commands.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The term "feature" associated with data points and the term "feature-point" associated with images as used in the specification have distinct meaning and are not related to each other.

The present invention would now be discussed in context of embodiments as illustrated in the accompanying drawings.

Figure 1:
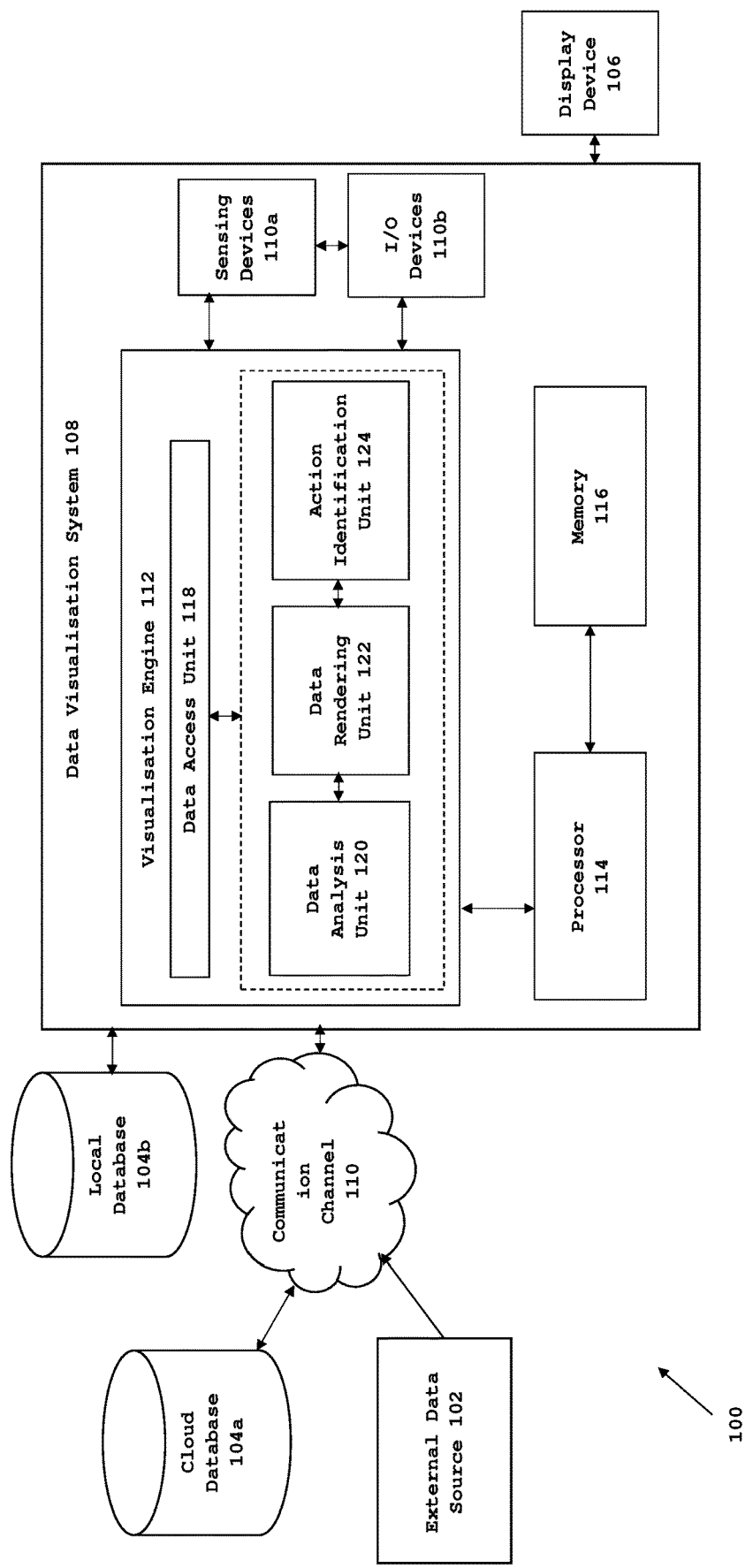
FIG. 1 illustrates a detailed block diagram of a system for providing automated data visualization and modification of visualized data based on identification of user actions, in accordance with various embodiments of the present invention.

FIG. 1 illustrates a detailed block diagram of a system for providing automated data visualization and modification of visualized data based on identification of user actions, in accordance with various embodiments of the present invention. Referring to FIG. 1, in an embodiment of the present invention, an environment 100 including the system for providing automated data visualization and modification is illustrated. In various embodiments of the present invention, the environment 100 includes an external data source 102, a cloud database 104a, a local database 104b, a display device 106 and a system for providing automated data visualization and modification hereinafter referred to as data visualization system 108.

In various embodiments of the present invention, the external data source 102 comprises a collection of complex dimensional data. The external data source 102 may include at least one of: a remote storage and a local storage configured to collect and maintain single or multidimensional data from enterprises or other sources. In an exemplary embodiment of the present invention, the dimensional data may be univariate, bivariate and/or multivariate. In an exemplary embodiment of the present invention, the dimensional data may be structured data such as classification, regression, and time series data. An example of structured classification data including numerical or categorical data may be a combination of multiple features such as Age (Numerical), Gender (categorical—Male/Female/Other), disease (target column—categorical—Yes/No). In another exemplary embodiment of the present invention, the dimensional data may be unstructured data such as text.

In various embodiments of the present invention, the cloud database 104a and the local database 104b are configured to maintain the data retrieved and visualized by the data visualization system 108. Examples of the cloud database 104a may include, but are not limited to, may be a PostgreSQL database, relational database management system (RDBMS) such as BigQuery. Examples of the local database 104b may include, but are not limited to, SQLite Database.

In various embodiments of the present invention, a display device 106 may be selected from, but not limited to, a group of virtual reality displays, augmented reality displays, mixed reality displays, smartphones or any other device capable of displaying single or multidimensional data in real world environment or on a screen.

In various embodiments of the present invention, the data visualization system 108 may be a hardware, a software or a combination of hardware and software. In an embodiment of the present invention as shown in FIG. 1, the data visualization system 108 is a combination of hardware and software. The data visualization system 108 is configured to interface with the external data source 102 to retrieve complex data over a communication channel 110. Examples of the communication channel 110 may include, but are not limited to, an interface such as a software interface, a physical transmission medium, such as, a wire, or a logical connection over a multiplexed medium, such as, a radio channel in telecommunications and computer networking. Examples of radio channel in telecommunications and computer networking may include, but are not limited to, a Local Area Network (LAN), a Metropolitan Area Network (MAN), and a Wide Area Network (WAN). Further the data visualization system 108 is configured to interface with the cloud database 104a and the local database 104b to maintain the retrieved data and the visualized data. In an embodiment of the present invention, as shown in FIG. 1, the data visualization system 108 interfaces with the cloud database 104a over the communication channel 110. Yet further, the data visualization system, interfaces with the display device 106 to output/display the visualized data.

In another embodiment of the present invention, the data visualization system 108 may be a software component integrated with a display device 106. Examples of display devices may include, but are not limited to, virtual reality displays, augmented reality displays, mixed reality displays, smartphones or any other device capable of displaying single or multidimensional data in real world environment or on a screen.

In another embodiment of the present invention, the data visualization system 108 may be implemented as a client-server architecture, wherein one or more display devices (not shown) access a server hosting the data visualization system 108 over a communication channel (110). In yet another embodiment of the present invention, the data visualization system 108 may be implemented in a cloud computing architecture in which data, applications, services, and other resources are stored and delivered through shared data-centers. In an exemplary embodiment of the present invention, the functionalities of the data visualization system 108 are delivered as software as a service (SAAS).

In an embodiment of the present invention as shown in FIG. 1, the data visualization system 108 comprises a plurality of sensing devices 110a, one or more input/output (I/O) devices 110b, a visualization engine 112, at least one processor 114 and a memory 116. The visualization engine 112 is operated via the processor 114 specifically programmed to execute instructions stored in the memory 116 for executing functionalities of the system 108 in accordance with various embodiments of the present invention. The sensing devices 110a and the I/O devices 110b are configured to interface with each other. The sensing devices 110a may include at least an optical sensor, a depth sensor, a touch sensor, microphone, acoustic sensor or any other wired or wireless device capable of estimating surrounding light, surrounding movements and sound. Examples of the one or more input/output (I/O) devices 110b may include, but are not limited to, a touchscreen display, or any other wired or wireless device capable of receiving inputs and outputting results.

In various embodiments of the present invention, the visualization engine 112 is a self-learning engine configured to retrieve complex single or multidimensional data, analyze datasets, identify data points, evaluate visual representations, estimate surrounding real-world lighting, visualize data and interpret user actions in real-time. In various embodiments of the present invention, the visualization engine 110 has multiple units which work in conjunction with each other for providing automated data visualization and modification of visualized data based on identification of user actions. The various units of the visualization engine 112 are operated via the processor 114 specifically programmed to execute instructions stored in the memory 116 for executing respective functionalities of the multiple units in accordance with various embodiments of the present invention. In an embodiment of the present invention, the memory 116 may be divided into a Random Access Memory (RAM) and a Read-only memory (ROM). In an embodiment of the present invention, the visualization engine 112 comprises a data access unit 118, a data analysis unit 120, a data rendering unit 122 and an action identification unit 124.

In an embodiment of the present invention, the data access unit 118 is configured to interface with the external data source 102, the cloud database 104a and the local database 104b. The data access unit 118 is configured to retrieve the data selected for visualization from the external data source 102 over the communication channel 110. Further, the data access unit 118 is configured to maintain the retrieved and the visualized data in at least one of: the cloud database 104a and the local database 104b based on the size of data and user selection. In an embodiment of the present invention, the data access unit 118 is configured to authenticate access to a database (not shown) within the external data source 102 to select and retrieve data. In an embodiment of the present invention, the data access unit 118 is configured to authenticate access to select at least one of: the cloud database 104a and the local database 104b for maintaining retrieved data and the visualized data.

In an embodiment of the present invention the data access unit 118 is configured to authenticate the users using at least one or more authentication techniques selected from a custom based authentication and a Single sign-on) (SSO) based authentication based on a user group. In operation, the data access unit 118 identifies the user group and accordingly establishes the authentication technique. In an exemplary embodiment of the present invention, the custom based authentication is implemented for individual users and specific group, and the SSO based authentication is implemented for a corporate user group. In an exemplary embodiment of the present invention, the custom based authentication, may include, but is not limited to implementing a JSON Web Token (JWT) authentication for authenticating the individual users and users of the specific group. Further, the generated access token is passed with every user request to validate and secure user's data. The SSO based authentication may include, but is not limited to the implementation of LDAP authentication mechanism to authenticate users. Subsequent to the user authentication, the data access unit 118 provides access to the external data source 102 and provides options for the selection of the cloud database 104a and the local database 104b. Further, the data may be selected and retrieved from the external data source 102 by the user via I/O device 110b. The selected data may be loaded in at least one of: the cloud database 104a and the local database 104b based on a user selection.

In an embodiment of the present invention, the data analysis unit 120 is configured to receive the data selected for visualization from the data access unit 118. The data analysis unit 120 is configured to identify one or more data points and one or more datatypes associated with the received data selected for visualization. In particular, the data analysis unit 120 is configured to identify one or more data points comprising one or more features, and the one or more datatypes associated with the one or more features by analyzing and categorizing the data selected for visualization. The data analysis unit 120 is configured to analyse the selected data and categorize the selected data. In an exemplary embodiment of the present invention, the analysing and categorising of the selected data includes identifying the category of selected data. An example of data categorisation, may include, but is not limited to categorising the selected data as at least one of: time series, regression and classification data. Further, analysing and categorising of the selected data includes extracting one or more features from the selected data, and identifying the data types of all the features. An example of data types, may include but is not limited to, a numerical, text, Boolean, date, time, and categorical data type. Example of a categorical data type may be any feature having discrete values. Example of a numerical data type may include continuous variable, where data can be from − infinity to + infinity. Example of a Boolean data type may include True/False. Example of a text data type may include data in the form of words. In an exemplary embodiment of the present invention, the one or more datatypes of the one or more extracted features are identified using a datatype checker pipeline, where the data type checker pipeline includes a plurality of data type checkers, each having one or more datatype libraries. In operation, each of the extracted features first pass through a Numerical data type checker. If the feature fits to this data type, it is assigned Numerical data type, else it would pass through next data type checker. In the next step, the extracted features are passed though the Datetime type checker using a Pandas library. If the features successfully pass through the Datetime type checker, the feature is assigned Datetime type, else it is passed through the next data type checker. Further, the features are passed through Boolean data type checker and is assigned Boolean data type on successfully passing through the checker, else it is passed through the final data type checker. In the final data type checker, the unique values associated with the features are checked. If unique values count matches the total values count for that feature, it is assigned Text as type otherwise categorical type is assigned.

Yet further, analysing and categorising of the selected data includes creating data structures by aligning the extracted features in columns to identify the associated data points. In an exemplary embodiment of the present invention, python data frame is used for creating data structures from the extracted features.

The data analysis unit 120 is further configured to identify the data points from the categorised data. In an exemplary embodiment of the present invention, the data analysis unit 120 identifies data points associated with the categorised data using data analysis techniques such as exploratory data analysis (EDA). In particular, the data points are identified based on the pattern they bear, some threshold analysis and data type verification of the extracted features of the selected data to compute ratio of missing values and correlation with respect to all other features (columns) of the data structure. For example if there is a column having complete unique values then it is primarily of no use to be considered for other columns.

Table 1 below shows an exemplary data structure having rows and columns, wherein each row is representative of a data point associated with an individual, and each column is representative of a feature (i.e. a measurement associated with the data point to study or observe the individual).

TABLE 1

| Name | Age | Gender | Employment |
|---|---|---|---|
| Pooja Gupta | 25 | Female | Yes |

As can be observed from the exemplary Table 1, a data point is a set of one or more features or measurements associated with an individual. The data point in table 1 is a single row having values for all the features (Name, age, gender, employment) of an individual in that row.

In various embodiments of the present invention, the data access unit 120 is configured to evaluate one or more visual representations for rendering the selected data based on the identified data points and the data types associated with the extracted features using a predetermined set of mapping criteria. In an embodiment of the present invention, the visual representations may be selected from a group comprising, but not limited to, graphs, charts, tables, maps, infographics, and dashboards. In an embodiment of the present invention, the data access unit 120 generates a mapping table comprising the datatypes and their corresponding visual representations based on the predetermined set of mapping criteria. For example: in case of categorical data type, if feature's count of unique values crosses a predefined threshold value, for instance 30, then bar or pie chart is evaluated as a visual representation for rendering such data. It is to be noted that all visual representations do not work for all data types in the categorised data. For example a line chart is not feasible for the text data type etc.

Table 2 below is an exemplary table exemplifying the predetermined set of mapping criteria for evaluating the one or more visual representations based on the identified data types.

TABLE 2

| S. No. | Data Type | Criteria | Visual Representation |
|---|---|---|---|
| 1. | Numerical | If the Unique values' count in Numerical Type feature is less than or equal to 50 | Histogram Plot to illustrate distribution of values |
|  |  | If the unique values' count is more than 50. | Scatterplot to show distribution of values. |
| 2. | Boolean | If there is a Datetime feature in the data. | Stacked Bar plot to show relationship between the categories of values |
|  |  | If there is no Datetime feature in data. | Pie chart to show distribution of values |
| 3. | Categorical | If unique values' count is less than 20 | Pie chart to show distribution of values |
|  |  | If unique values' count is less than 50 and more than 20 | Histogram to show distribution of values |
| 4. | Datetime | If there are numerical data types in dataset. Extract year from Datetime and plot the trend of data. | Line plot to show the trend of data |
|  |  | With one numerical data type in dataset, plot the area plot to show the trend. | Area plot to show the trend of data more clearly |

Table 3 below is another exemplary table showing the mapping between the data types and corresponding optimal visual representations.

TABLE 3

| Data Type | Visual Representation |
|---|---|
| Numerical | Line chart, histogram, box plot, violin plot |
| Categorical | Pie chart, Bar chart, Scatter Plot |
| Boolean | Stacked Bar chart |

In an embodiment of the present invention, the rendering unit 122 is configured to receive the identified data points, the one or more data types, and the evaluated one or more visual representations from the data analysis unit 120. Further, the data rendering unit 122 is configured to visualise the selected data, in particular the identified data points having the one or more features using the evaluated one or more visual representations based on an identification of the type of display device 106. In various embodiments of the present invention, the data rendering unit 122 is configured to visualise the selected data based on the evaluated one or more visual representation using one or more data rendering techniques. As already mentioned in the specification, examples of the display device 106 may include, but are not limited to, virtual reality displays, augmented reality displays, mixed reality displays, smartphones or any other wired or wireless capable of displaying single or multidimensional representations/objects in real world environment or on a screen. In an exemplary embodiment of the present invention, the display device 106 is identified based on a user input.

In various embodiments of the present invention, the data rendering unit 122 is configured to evaluate a theme of the evaluated one or more visual representations using a real-time lighting information of the real world environment on identification of virtual reality display as the type of display device 106. The theme is representative of color and texture of the visual representations. In an exemplary embodiment of the present invention, the data rendering unit 122 is configured to estimate the real-time lighting information of the real world environment if the display device 106 is identified as a virtual reality display. In operation the data rendering unit 122 estimates the real-time lighting information of the real world environment via the one or more sensing devices 110a and/or the virtual reality display (display device 106). In particular, the data rendering unit 122, retrieves information of the surrounding environment via at least one of: the optical sensors among the sensing devices 110a and the optical sensors of the virtual reality display device, wherein, the feature-points (i.e. the points in images that invariant under view changes, zoom, lightening conditions etc.) are extracted from the images of the surrounding environment. Further, the data rendering unit 122 estimates the real-time lighting information of the real world environment using pixel intensity of the extracted feature points. In an exemplary embodiment of the present invention, the lighting information is computed based on the lighting parameters such as ambient light, shadows, shading, specular highlights and reflection. The data rendering unit 122 evaluates a theme of the evaluated one or more visual representations using the estimated real-time lighting information of the real world.

Further, the data rendering unit 122, visualizes the selected data, in particular the identified data points and associated features using the evaluated one or more visual representations and the estimated real-time lighting information if the display device 106 is a virtual reality display. In an exemplary embodiment of the present invention, the data rendering unit 122 is integrated with an ARcore module to visualize the selected data based on the evaluated one or more visual representations and the estimated real-time lighting information. In operation, the data rendering unit 122 uses a set of rules to visualize the selected data based on the evaluated one or more visual representations. In an exemplary embodiment of the present invention, the identified one or more data points or features may be selected by a user via the I/O device 110b. Further, the data rendering unit 122 evaluates the 3D objects suitable for visualizing the visual representation corresponding to the datatype of the selected one or more features. For example, Cuboid may be selected to create bar chart, Sphere may be selected to create a scatter plot etc. The data rendering unit 122 is configured to compute (coordinates) vertices, materials, textures, etc. of the evaluated 3D objects based on the real-time lighting information and the feature values associated with the features of the identified data points. In an embodiment of the present invention, the evaluated 3D objects may be rendered using any of the following, XML Layout, prebuilt 3D assets files (OBJ, FBX, glTF) or 3D Shapes. In an exemplary embodiment of the present invention, the 3D objects suitable for visualizing the visual representation corresponding to the datatype of the selected one or more features are rendered using 3D shapes via the ARCore module. In operation, the data rendering unit 122 extracts the feature values, and the frequency of feature values for plotting the evaluated one or more visual representations. Further, the data rendering unit 122 uses the ARCore module to augment the 3D object corresponding to selected visual representation into a 3D Model. The ARCore module includes Shape Factory and Material Factory classes, which further comprises 3D objects such as Sphere, Cuboid, Cube, etc. The data rendering unit 122 uses the ARCore module to augment visualization of the visual representation corresponding to the datatype of the selected one or more features (data structure columns as exemplified in Table 1) in real world environment. The real-time lighting information facilitates the data rendering unit 122 to enhance real world experience during visualization. For example: If the real-world lighting is dim, the visual representations are brightened to be visible. Similarly, if the real-world lighting is too bright, the visual representation may be of dark colors. An example illustrating the visualization of the selected data is described below. In the example the evaluated visual representation is a bar plot having x and y axis. The data rendering unit evaluates cylinder as a 3D object to represent a bar. The data rendering unit 122 further evaluates the total number of features to plot on x-axis. The total number of features are representative of the total number of bars (cylinders) which are to be visualized. Further, the frequency of every x in y-axis is computed. The data rendering unit creates 'n' numbers of cylindrical shapes ranging based on 'y' data using the computed frequency via ARCore Shape Factory. Yet further, the data rendering unit 122 evaluates the color/material of the 3D cylinders based on the real-time lighting information. For instance a darker color with no metallic property, high roughness and low reflectance may be selected if the light estimation is bright. The evaluated material is applied to each of the 3D cylinders. Finally, the default XY axis planes are selected, and the created 3D shapes are arranged in an order to form a Bar Plot.

In various embodiments of the present invention, the data rendering unit 122 is configured to visualize the selected data, in particular the identified data points and associated features using the evaluated one or more visual representations on identification of display device 106 as a smart phone or any other wired or wireless device capable device capable of displaying single or multidimensional representations/objects. In operation, the data rendering unit 122 uses a set of rules to visualize the categorised selected data based on the evaluated one or more visual representations. In exemplary embodiment of the present invention, the identified one or more data points or features may be selected by a user via the I/O device 110b or by the smart phone display device 106. Further, the data rendering unit 122 uses the ARCore module to augment visualization of the visual representation corresponding to the datatype of the selected one or more features on the smartphone display device. The ARCore module includes Shape Factory and Material Factory classes, which further comprises 3D objects such as Sphere, Cuboid, Cube, etc. The data rendering unit 122 evaluates the objects suitable for visualizing the visual representation corresponding to the datatype of the selected one or more features. For example: a rectangle may be used for creating bar visual representations corresponding to a numerical data type etc. The data rendering unit 122 is configured to compute (coordinates) vertices, materials, textures, etc. for the evaluated objects based on the feature values associated with the features of the identified data points. In various embodiment of the present invention, the data rendering unit 122 visualises the visual representations corresponding to the datatypes via the identified display device 106 for analysis and modification by the user. In an embodiment of the present invention, the visualization may be stored in at least one of: the cloud database 104a and the local database 104b. In an exemplary embodiment of the present invention, the visualization may be marked with a unique id. The unique id facilitates the visualization to be shared with other users or for future use and reference. In an exemplary embodiment of the present invention, ARCore Cloud Anchors are implemented to host user's visualization on cloud. The shared visualization may be accessed by other user's using the unique id. Advantageously, the visual representations corresponding to the datatypes of the features (columns) facilitates better understanding of co-relation between the features.

In an embodiment of the present invention, the action identification unit 124 is configured to receive the display device 106 type information from the data rendering unit 122. In an embodiment of the present invention, the action identification unit 124 is configured to enable user interaction for analysis and modification of the visualized data. The action identification unit 124 is configured to enable user interaction for analysis and modification of the visualized data based on the type of identified display device 106 and user selection. The user actions may include, but are not limited to, hand gestures, touch inputs and voice commands. In an embodiment of the present invention, the user actions are customisable as per the user. The action identification unit 124 is configured to identify user actions and interpret inputs from the identified user actions to analyse and modify visualized data.

In operation, the action identification unit 124 is configured to identify the user actions such as hand movements, touch inputs and voice commands are via at least one of: the plurality of sensing devices 110a and the plurality of sensors of the display device 106. Further, an action interpretation model is selected based on the identified user action. In various embodiments of the present invention, the action interpretation models are self-learning models and are updated with every user interaction. Further, the action identification unit 124 selects an action interpretation model based on the identified user action. In an exemplary embodiment of the present invention, the action interpretation model is built using one or more machine learning techniques, and comprises a gesture recognition model, a voice recognition model and a touch interpretation model. In particular, the action identification unit 124 selects a gesture recognition model if a hand movement is detected. The action identification unit 124 selects a voice recognition model if a sound signal is detected. The action identification unit 124 selects a touch interpretation model if a touch input is detected.

In operation in an embodiment of the present invention, the action identification unit 124 retrieves image frames in real time via the optical sensors from the plurality of sensing devices 110a and/or the optical sensors (not shown) of the identified display device 106. The image frames are processed and analyzed to detect hand gestures in the frames using a gesture recognition model. The image frames are further analyzed and processed to interpret inputs from the hand gestures in the frame using the gesture recognition model. Examples of hand gestures may include, but are not limited to, select, move, zoom in, zoom out, discard, randomize. In an exemplary embodiment of the present invention, a hand pointing to a particular object is identified as a selection gesture. Likewise, a waving hand movement in left/right directions is identified as a swipe gesture or a rotation gesture.

In an embodiment of the present invention, the gesture recognition model is built using the steps as described below. As a first step, a dataset is generated for preparing the model. In an embodiment of the present invention, the dataset is prepared by recording frames showing various hand gestures prior to model implementation. In an exemplary embodiment of the present invention, the hand gestures may include, but are not limited to, select, move, zoom in, zoom out, discard, randomize. In an exemplary embodiment of the present invention, the dataset may be obtained from EGOHands. The EGOHands dataset comprises 15,053 ground-truth labelled hands. The generated dataset is pre-processed. In an embodiment of the present invention, data pre-processing includes labelling the extracted frames, and processing the image frames in standard format. In an exemplary embodiment of the present invention, the image frames are processed using OpenCV. In operation, the extracted image frames are converted to grayscale. Further, the grayscale image frames are de-noised. Yet further, the de-noised grayscale image frames are converted to binary images, where the binary images have pixel value set as 1 for hand and rest as 0, facilitating clear identification of hand from background noise.

As a second step, the generated dataset is divided into three categories. In an embodiment of the present invention, the generated dataset is divided into train dataset, Validation dataset and testing dataset. The above division is obtained by creating different categories of image frames based on the color, hand position, background, etc.

As a third step, the gesture recognition model trained using the training dataset by using transfer learning technique. As a fourth step the gesture recognition model is updated using the validation dataset. In an embodiment of the present invention, the performance metrics including, but not limited to LogLoss, Accuracy, AUC, ROC, F1 Score, Categorical Cross Entropy etc. are evaluated based on the validation dataset. Further the model is updated with improvements using hyper parameter tuning.

As a final step, the updated gesture recognition model is implemented for detecting hand gestures. In an exemplary embodiment of the present invention, the gesture recognition model is implemented using Tensor flow Lite. In various embodiment of the present invention, the implemented gesture recognition model is updated after every user interaction. In an embodiment of the present invention, various detected hand gestures of the user during analysis and modification of visualized data are used for updating the gesture recognition model.

The action interpretation unit 124 interprets inputs from sound signals. The action identification unit interprets inputs from sound signal using the voice recognition model. In an embodiment of the present invention, the voice recognition model comprises a speech recognition model and a voice interpretation model. In an exemplary embodiment of the present invention, a speech recognition model is used to convert the detected speech input into text. The voice interpretation model is used to interpret user's intent to perform an action from the detected text. In operation, the action identification unit 124 receives sounds signals via the microphone from the plurality of sensing devices 110a and/or the microphone of the identified display device 106. The received sound signals are processed and analyzed to detect speech. In an exemplary embodiment of the present invention, a speech recognition model is used to convert the detected speech input into text. In another exemplary embodiment of the present invention, a speech to text module of the display device 106 such as a smart phone may be used for converting the detected speech input into text. Further, the text obtained from the detected speech is interpreted to identify user's intent to perform an action using voice interpretation model. In an exemplary embodiment of the present invention, the voice interpretation model is a custom text classification model and is configured to detect user's intent pertaining to visualization and modification of data. In an exemplary embodiment of the present invention, the voice interpretation model is built using TensorFlow lite or scikit-learn tools.

The action interpretation unit 124 is configured to interpret user input from touch actions using the touch recognition model. The action identification unit 124 receives touch user actions via at least one of: the plurality of sensors 110a and touch sensors of the identified display device 106. The touch inputs are processed and analyzed to interpret inputs from the touch gestures using the touch recognition model.

Advantageously, the data visualization system 108 of the present invention automates data visualization based on the intelligence extracted from the selected data and real world environment. Further, the system of the present invention provides identification of user actions and interpretation of inputs from the identified user actions to analyse and modify the visualized data.

Figure 2:
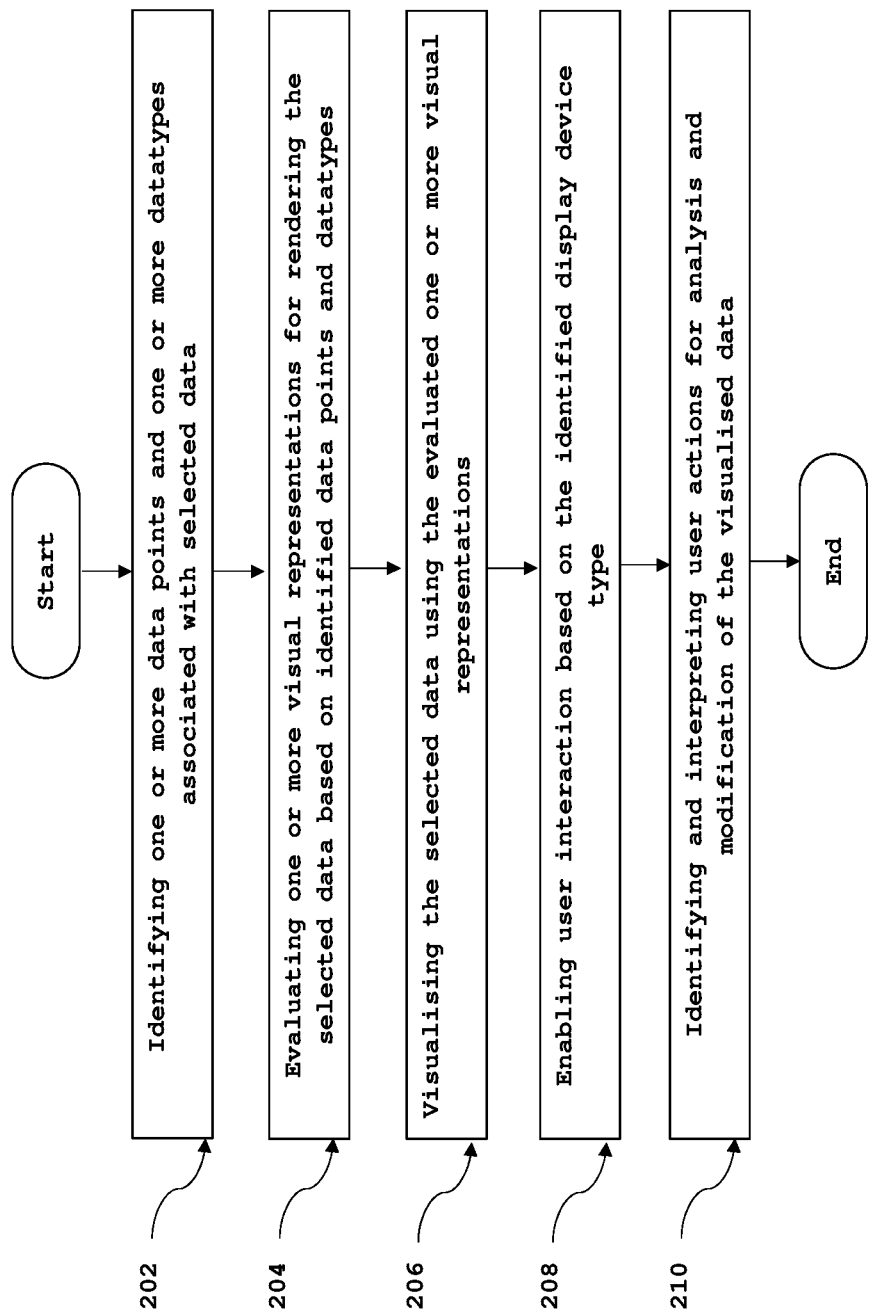
FIG. 2 is a flowchart illustrating a method for providing automated data visualization and modification of visualized data based on identification of user actions, in accordance with various embodiments of the present invention.

FIG. 2 is a flowchart illustrating a method for providing automated data visualization and modification of visualized data based on identification of user actions, in accordance with various embodiments of the present invention.

At step 202, one or more data points and one or more datatypes associated with data selected for visualization are identified. In an embodiment of the present invention, the one or more data points comprising one or more features, and the one or more datatypes associated with the one or more features are identified by analyzing and categorizing the data selected for visualization. In an embodiment of the present invention, the data selected for visualization is retrieved from an external data source. In an exemplary embodiment of the present invention, the data for visualization may be selected by a user via I/O device. The retrieved data is analyzed and categorized. In an exemplary embodiment of the present invention, the analysing and categorising of the selected data includes identifying the category of selected data. An example of data categorisation, may include, but is not limited to categorising the selected data as at least one of: time series, regression and classification data. Further, analysing and categorising of the selected data includes extracting one or more features from the selected data, and identifying the data types of all the features. An example of data types, may include but is not limited to, a numerical, text, Boolean, date, time, and categorical data type. Example of a categorical data type may include any column having discrete values in a column. Example of a numerical data type may include continuous variable, where the data can be from − infinity to + infinity. Example of a boolean data type may include True/False. Example of a text data type may include data in the form of words. In an exemplary embodiment of the present invention, the one or more datatypes of the one or more extracted features are identified using a datatype checker pipeline, where the data type checker pipeline includes a plurality of data type checkers, each having one or more datatype libraries. In operation, each of the extracted features first pass through a Numerical data type checker. If the feature fits to this data type, it is assigned Numerical data type, else it would pass through next data type checker. In the next step, the extracted features are passed though the Datetime type checker using a Pandas library. If the features successfully pass through the Datetime type checker, the feature is assigned Datetime type, else it is passed through the next data type checker. Further, the features are passed through Boolean data type checker and is assigned Boolean data type on successfully passing through the checker, else it is passed through the final data type checker. In the final data type checker, the unique values associated with the features are checked. If unique values count matches the total values count for that feature, it is assigned Text as type otherwise categorical type is assigned. Yet further, analysing and categorising of the selected data includes creating data structures by aligning the extracted features in columns to identify the associated data points. In an exemplary embodiment of the present invention, python data frame is used for creating data structures from the extracted features.

In an embodiment of the present invention, the data points associated with the selected data are identified from the categorised data. In an exemplary embodiment of the present invention, the data points associated with the selected data are identified using data analysis techniques such as exploratory data analysis (EDA) on the categorised data. In particular, the data analysis techniques include identifying the data points based on the pattern they bear, some threshold analysis and data type verification of the extracted features of the selected data to compute ratio of missing feature values and correlation with respect to all other features (columns) of the data structure. For example if there is a column having complete unique values then it's primarily of no use to be considered for other columns.

As already described with reference to FIG. 1, Table 1 below shows an exemplary data structure having rows and columns, wherein each row is representative of a data point associated with an individual, and each column is representative of a feature (i.e. a measurement associated with the data point to study or observe the individual).

TABLE 1

| Name | Age | Gender | Employment |
| --- | --- | --- | --- |
| Pooja Gupta | 25 | Female | Yes |

As can be observed from the exemplary Table 1, a data point is a set of one or more features or measurements associated with an individual. The data point in table 1 is a single row having values for all the features (Name, age, gender, employment) of an individual in that row.

At step 204, one or more visual representations for rendering the selected data are evaluated. In an embodiment of the present invention, the one or more visual representations for rendering the selected data are evaluated based on the identified data points and the data types associated with the extracted features using a predetermined set of mapping criteria. In an embodiment of the present invention, the visual representations may be selected from a group comprising, but not limited to, graphs, charts, tables, maps, infographics, and dashboards. In an embodiment of the present invention, the data access unit 120 generates a mapping table comprising the datatypes and their corresponding visual representations based on the predetermined set of mapping criteria. For example: in case of categorical data type, if column's count of unique values crosses a predefined threshold value, for instance 30, then bar or pie chart is evaluated as a visual representation for rendering such data. It is to be noted that all visual representations do not work for all data types in the categorised data. For example a line chart is not feasible for the text data type etc.

As already described above in the specification with reference to FIG. 1, Table 2 is an exemplary table exemplifying the predetermined set of mapping criteria for evaluating the one or more visual representations based on the identified data types.

TABLE 2

| S. No. | Data Type | Criteria | Visual Representation |
|---|---|---|---|
| 1. | Numerical | If the Unique values' count in Numerical Type feature is less than or equal to 50 | Histogram Plot to illustrate distribution of values |
|  |  | If the unique values' count is more than 50. | Scatterplot to show distribution of values. |
| 2. | Boolean | If there is a Datetime feature in the data. | Stacked Bar plot to show relationship between the categories of values |
|  |  | If there is no Datetime feature in data. | Pie chart to show distribution of values |
| 3. | Categorical | If unique values' count is less than 20 | Pie chart to show distribution of values |
|  |  | If unique values' count is less than 50 and more than 20 | Histogram to show distribution of values |
| 4. | Datetime | If there are numerical data types in dataset. Extract year from Datetime and plot the trend of data. | Line plot to show the trend of data |
|  |  | With one numerical data type in dataset, plot the area plot to show the trend. | Area plot to show the trend of data more clearly |

As already described above in the specification with reference to FIG. 1, Table 3 is another exemplary table showing the mapping between the data types and corresponding optimal visual representations.

TABLE 3

| Data Type | Visual Representation |
|---|---|
| Numerical | Line chart, histogram, box plot, violin plot |
| Categorical | Pie chart, Bar chart, Scatter Plot |
| Boolean | Stacked Bar chart |

At step 206, the data selected for visualization (also referred to as selected data) is visualized using the evaluated one or more visual representations via a display device. In an embodiment of the present invention, the selected data is visualized based on the evaluated one or more visual representations based on an identification of a display device type using one or more data rendering techniques. In particular, the identified data points having the one or more features are visualised using the evaluated one or more visual representations based on an identification of the type of display device (106 of FIG. 1). In an exemplary embodiment of the present invention, the type of display device 106 may include, but is not limited to, virtual reality displays, augmented reality displays, mixed reality displays, smartphones or any other wired or wireless devices capable of displaying single or multidimensional representations/objects in real world environment or on a screen. In an exemplary embodiment of the present invention, the display device 106 is identified based on user input.

In various embodiments of the present invention, a theme of evaluated one or more visual representations is evaluated using a real-time lighting information of the real world environment on identification of virtual reality display as the type of display device. In an exemplary embodiment of the present invention, the real-time lighting information of the real world environment is estimated if the display device is identified as a virtual reality display. In operation, the real-time lighting information of the real world environment is estimated via the one or more sensing devices and/or the virtual reality display (display device). In particular, information associated with surrounding environment is retrieved via at least one of: the optical sensors among the sensing devices and the optical sensors of the virtual reality display device, wherein, the feature points (i.e. the points in images that are invariant under view changes, zoom, lightening conditions etc.) are extracted from the images of the surrounding environment. Further, the real-time lighting information of the real world environment is estimated using pixel intensity of the extracted feature points. In an exemplary embodiment of the present invention, the lighting information is estimated based on a plurality of lighting parameters such as ambient light, shadows, shading, specular highlights and reflection. The theme of the evaluated one or more visual representations is evaluated using the estimated real-time lighting information of the real world.

Further, the selected data, in particular the identified data points and associated features are visualized based on the evaluated one or more visual representations and theme of the evaluated one or more visual representations if the display device 106 is a virtual reality display. In operation, a set of rules are used for visualizing the selected data based on the evaluated one or more visual representations. In exemplary embodiment of the present invention, the identified one or more data points or features may be selected by a user via an I/O device. Further, 3D objects suitable for visualizing the visual representations corresponding to the datatype of the selected one or more features are evaluated. In an exemplary embodiment of the present invention, said 3D objects may be evaluated from an ARcore module, including shape factory classes and material factory classes. For example, Cuboid may be selected to create bar chart, Sphere may be selected to create a scatter plot etc. The (coordinates) vertices, materials, textures, etc. for the evaluated 3D objects are computed based on the real-time lighting information and the feature values associated with the features of the identified data points. In an embodiment of the present invention, the evaluated 3D objects may be rendered using any of the following, XML Layout, prebuilt 3D assets files (OBJ, FBX, glTF) or 3D Shapes. Further, the 3D object corresponding to selected visual representation are augmented into a 3D Model using 3D shapes library of ARCore module. Advantageously, the real-time lighting information enhances real world experience during visualization. For example: If the real-world lighting is dim, the theme of the visual representations are brightened for visibility. Similarly, if the real-world lighting is too bright, the theme of the visual representations may be darkened. An example illustrating the visualization of the selected data is described below. In the example the evaluated visual representation is a bar plot having x and y axis. As a first step cylinder shape is evaluated as a 3D object to represent a bar. Further, the total number of features to plot on x-axis are evaluated. The total number of features are representative of the total number of bars (cylinders) which are to be visualized. Further, the frequency of every x in y-axis is computed, followed by creation of 'n' numbers of cylindrical shapes ranging based on 'y' data using the computed frequency via ARCore Shape Factory. Yet further, the color/material of the 3D cylinders is evaluated based on the real-time lighting information. For instance a darker color with no metallic property, high roughness and low reflectance may be selected if the light estimation is bright. The evaluated material is applied to each of the 3D cylinders. Finally, the default XY axis planes are selected, and the created 3D shapes are arranged in an order to form a Bar Plot.

In various embodiments of the present invention, the selected data, in particular the identified data points and associated features are visualized based on the evaluated one or more visual representations without an evaluation of theme, on identification of display device type as a smart phone or any other wired or wireless device capable device capable of displaying single or multidimensional representations/objects. In operation, a set of rules are used to visualize the selected data based on the evaluated one or more visual representations. In exemplary embodiment of the present invention, the identified one or more data points or features within the selected data may be further selected by a user via the I/O device or by the smart phone display device.

Further, objects suitable for visualizing the visual representations corresponding to the datatype of the selected one or more features are evaluated. In an exemplary embodiment of the present invention, said objects may be evaluated from an ARcore module, including shape factory classes and material factory classes. For example, rectangle may be selected to create bar chart visual representation, circle may be selected to create a scatter plot etc. The vertices (coordinates), materials, textures, etc. for the evaluated objects are computed based on the feature values associated with the features of the identified data points. Further, the visual representation corresponding to the datatype of the selected one or more features are augmented on the smartphone display device using an ARCore module.

In various embodiment of the present invention, the visual representations corresponding to the datatypes are visualized via the identified display device 106 for analysis and modification by the user. In an embodiment of the present invention, the visualization may be stored in at least one of: a cloud database and a local database 104b. In an exemplary embodiment of the present invention, the visualization may be marked with a unique id. The unique id facilitates the visualization to be shared with other users or for future use and reference. In an exemplary embodiment of the present invention, ARCore Cloud Anchors are implemented to host user's visualization on cloud. The shared visualization may be accessed by other user's using the unique id.

At step 208, user interaction for identifying user actions is enabled based on the identified display device type. In an embodiment of the present invention, user interaction is enabled based on the identified display device type for analysis and modification of the visualized data based on user actions. The user actions may include, but are not limited to, hand gestures, touch inputs and voice commands. In an embodiment of the present invention, the user actions are customisable as per the user. In an exemplary embodiment of the present invention, hand gestures and voice commands may be enabled for a virtual reality display device. In another exemplary embodiment of the present invention, touch inputs may be enabled for smartphone display device. In another embodiment of the present invention, hand gestures, touch inputs and voice commands may be enabled based on a user selection and sensor capability of the identified display device.

At step 210, user actions are identified and interpreted for analysis and modification of the visualized data. In operation in an embodiment of the present invention, the user actions such as hand movements, touch inputs and voice commands are identified via at least one of: the plurality of sensing devices 110a and the plurality of sensors of the display device. Further, an action interpretation model is selected based on the identified user action. In various embodiments of the present invention, the action interpretation models are self-learning models and are updated with every user interaction. In an exemplary embodiment of the present invention, the action interpretation model is built using one or more machine learning techniques, and comprises a gesture recognition model, a voice recognition model and a touch interpretation model. In particular, a gesture recognition model is selected if a hand movement is detected. A voice recognition model is selected if a sound signal is detected. A touch interpretation model is selected if a touch input is detected.

In operation in an embodiment of the present invention, image frames are retrieved in real time via the optical sensors from the plurality of sensing devices (110a of FIG. 1) and/or the optical sensors of the identified display device. The retrieved image frames are processed and analyzed to detect hand gestures in the frames using a gesture recognition model. The image frames are further analyzed and processed to interpret inputs from the hand gestures in the frame using the gesture recognition model. Examples of hand gestures may include, but are not limited to, select, move, zoom in, zoom out, discard, randomize. In an exemplary embodiment of the present invention, a hand pointing to a particular object is identified as a selection gesture. Likewise, a waving hand movement in left/right directions is identified as a swipe gesture or a rotation gesture.

In an embodiment of the present invention, the gesture recognition model is built using the steps as described below. As a first step, a dataset is generated for preparing the model. In an embodiment of the present invention, the dataset is prepared by recording frames showing various hand gestures prior to model implementation. In an exemplary embodiment of the present invention, the hand gestures may include, but are not limited to, select, move, zoom in, zoom out, discard, randomize. In an exemplary embodiment of the present invention, the dataset may be obtained from EGOHands. The EGOHands dataset comprises 15,053 ground-truth labelled hands. The generated dataset is preprocessed. In an embodiment of the present invention, data pre-processing includes labelling the extracted frames, and processing the image frames in standard format. In an exemplary embodiment of the present invention, the image frames are processed using OpenCV. In operation, the extracted image frames are converted to grayscale. Further, the grayscale image frames are de-noised. Yet further, the de-noised grayscale image frames are converted to binary images, where the binary images have pixel value set as 1 for hand and rest as 0, facilitating clear identification of hand from background noise.

As a second step, the generated dataset is divided into three categories. In an embodiment of the present invention, the generated dataset is divided into train dataset, Validation dataset and testing dataset. The above division is obtained by creating different categories of image frames based on the color, hand position, background, etc.

As a third step, the gesture recognition model trained using the training dataset by using transfer learning technique. As a fourth step the gesture recognition model is updated using the validation dataset. In an embodiment of the present invention, the performance metrics including, but not limited to LogLoss, Accuracy, AUC, ROC, F1 Score, Categorical Cross Entropy etc. are evaluated based on the validation dataset. Further, the model is updated with improvements using hyper parameter tuning.

As a final step, the updated gesture recognition model is implemented for detecting hand gestures. In an exemplary embodiment of the present invention, the gesture recognition model is implemented using Tensor flow Lite. In various embodiment of the present invention, the implemented gesture recognition model is updated after every user interaction. In an embodiment of the present invention, various detected hand gestures of the user during analysis and modification of visualized data are used for updating the gesture recognition model.

In an embodiment of the present invention, inputs from sound signal are interpreted using the voice recognition model. In an embodiment of the present invention, the voice recognition model comprises a speech recognition model and a voice interpretation model. In an exemplary embodiment of the present invention, a speech recognition model is used to convert the detected speech input into text. The voice interpretation model is used to interpret user's intent to perform an action from the detected text. In operation, sounds signals are received via the microphone from the plurality of sensing devices (110a of FIG. 1) and/or the microphone of the identified display device. The received sound signals are processed and analyzed to detect speech. In an exemplary embodiment of the present invention, a speech recognition model is used to convert the detected speech input into text. In another exemplary embodiment of the present invention, a speech to text module of the display device such as a smart phone may be used for converting the detected speech input into text. Further, the text obtained from the detected speech is interpreted to identify user's intent to perform an action using voice interpretation model. In an exemplary embodiment of the present invention, the voice interpretation model is a custom text classification model and is configured to detect user's intent pertaining to visualization and modification of data. In an exemplary embodiment of the present invention, the voice interpretation model is built using TensorFlow lite or scikit-learn tools.

In an embodiment of the present invention, user input from touch actions are identified using touch recognition model. The touch user actions are received via at least one of: the plurality of sensors 110a and touch sensors of the identified display device. The touch inputs are processed and analyzed to interpret inputs from the touch gestures using the touch recognition model.

Figure 3:
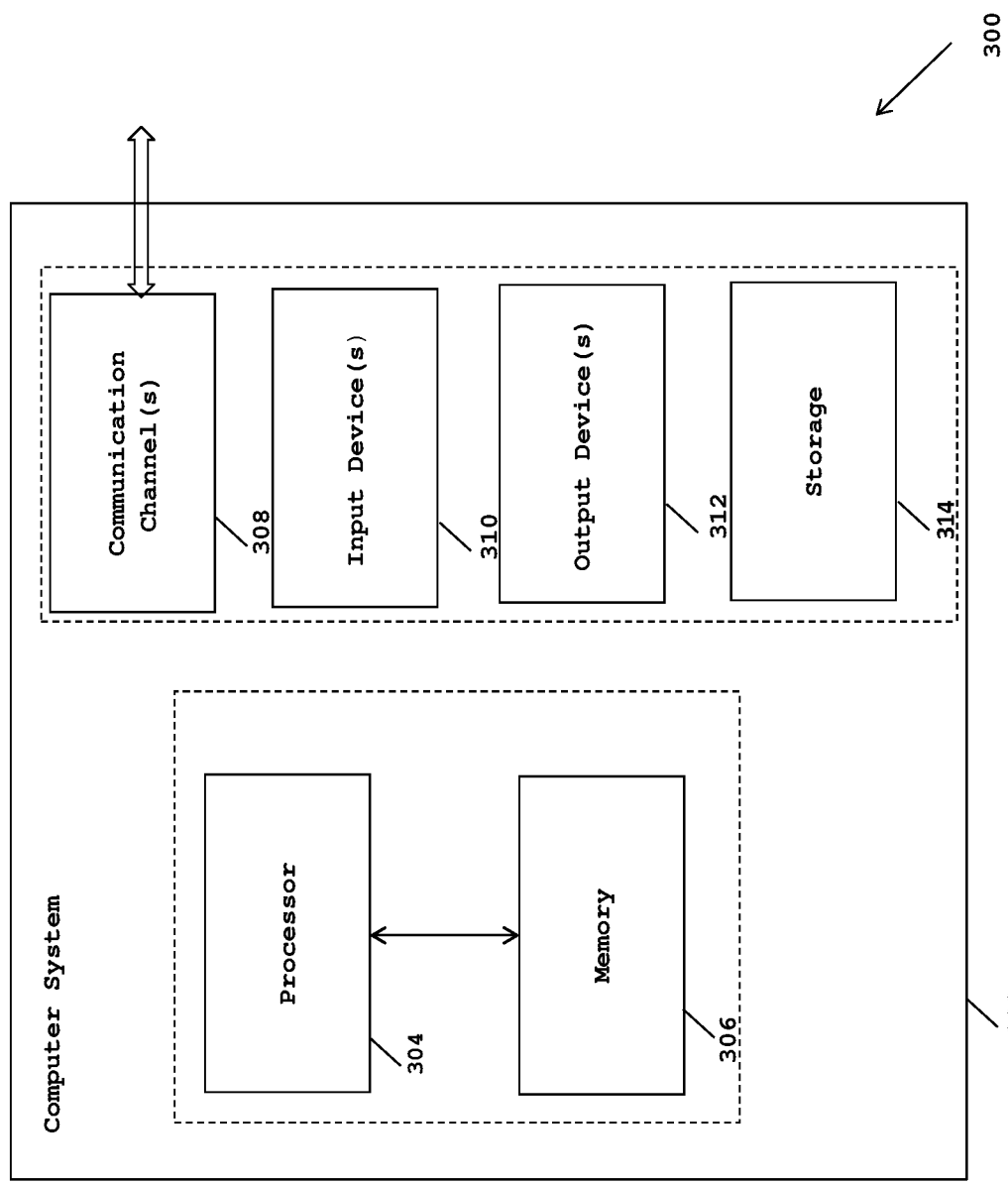
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for providing automated data visualization and modification of visualized data, wherein the method is implemented by at least one processor executing program instructions stored in a memory, the method comprising:
   identifying, by the at least one processor, one or more data points and one or more data types associated with a selected data using data analysis techniques;
   evaluating, by the at least one processor, one or more visual representations for rendering the selected data based on the one or more data points and the one or more data types using a mapping table generated based on a predetermined set of mapping criteria; and
   visualizing, by the at least one processor, the selected data based on the one or more visual representations via a display device based on an identification of a type of the display device using a data rendering technique.

2. The method as claimed in claim 1, wherein identifying the one or more data points and the one or more data types associated with the selected data using the data analysis techniques comprises:
   identifying a category of the selected data by analyzing and categorizing the selected data,
   extracting one or more features from the selected data based on the identified category, wherein the one or more features are representative of measurements associated with the one or more data points to observe the selected data;
   identifying the one or more data types of each of the one or more features using a datatype checker pipeline;
   creating data structures by aligning the extracted features in columns; and
   identifying the one or more data points associated with the selected data using data analysis techniques on the created data structures, wherein a pattern and correlation between the extracted features and the one or more datatypes is evaluated.

3. The method as claimed in claim 1, wherein the visual representations may be selected from graphs, charts, tables, maps, infographics, and dashboards.

4. The method as claimed in claim 1, wherein the type of display device is identified from virtual reality displays, augmented reality displays, mixed reality displays and smartphones.

5. The method as claimed in claim 1, wherein visualizing the selected data using the evaluated one or more visual representations via the display device comprises:
   evaluating one or more 3D objects for visualizing the evaluated one or more visual representations on identification of virtual reality display as the type of display device;
   computing coordinates of the one or more 3D objects based on feature values associated with one or more features of the identified one or more data points;
   evaluating a theme of the one or more 3D objects based on a real-time lighting information of a real world environment, wherein the theme is representative of color and texture the one or more 3D objects; and
   rendering the one or more 3D objects in the real world environment based on the computed coordinates and the evaluated theme, wherein the rendered one or more 3D objects are representative of visualized selected data.

6. The method as claimed in 5, wherein estimating the real-time lighting information of the real world environment comprises:
   retrieving information associated with the real world environment via one or more optical sensors, wherein one or more images of the real world environment are retrieved via the one or more optical sensors;
   extracting a plurality of feature-points from the retrieved images; and
   estimating the real-time lighting information of the real world environment using pixel intensity of the plurality of feature-points based on a plurality of lighting parameters.

7. The method as claimed in claim 1, wherein visualizing the selected data based on the evaluated one or more visual representations via the display device using the data rendering technique comprises evaluating one or more objects for visualizing the evaluated one or more visual representations on identification of smartphone as the type of display device; computing coordinates of the one or more objects based on feature values associated with one or more features of the identified one or more data points; and rendering the one or more objects on the smartphone using the computed coordinates, wherein the rendered one or more objects are representative of visualized selected data.

8. The method as claimed in claim 1, wherein the visualized data is analysed and modified using user actions, wherein the user actions include hand gestures, touch inputs and voice commands, further wherein the user actions are customizable.

9. The method as claimed in claim 8, wherein the user actions are identified via a plurality of sensing devices, and the identified user actions are interpreted for analysis and modification of the visualized data using machine learning techniques.

10. The method as claimed in claim 8, wherein identification and interpretation of the hand gestures comprises:
    retrieving image frames in real-time via one or more optical sensors;
    processing and analyzing the retrieved image frames to detect hand gestures in the frames using a gesture recognition model;
    interpreting inputs from the hand gestures in the frame using the gesture recognition model.

11. The method as claimed in claim 10, wherein the hand gestures include select, move, zoom in, zoom out, discard, and randomize.

12. The method as claimed in claim 8, wherein identification and interpretation of the voice commands comprises:
    identifying speech input by processing and analyzing retrieved sound signals;
    converting the identified speech input into a text using at least one of: a speech recognition machine learning model and a speech to text module of the display device;

interpreting the text using a voice interpretation machine learning model to identify user's intent.

13. The method as claimed in claim 8, wherein identification and interpretation of the touch inputs comprises processing and analyzing touch user actions received via touch sensors; and interpreting inputs from the processed and analyzed touch user actions.

14. A system for providing automated data visualization and modification of visualized data, interfacing with a display device, the system comprising:
a memory storing program instructions; a processor configured to execute program instructions stored in the memory; and a visualization engine executed by the processor, and configured to:
identify one or more data points and one or more data types associated with a selected data using data analysis techniques;
evaluate one or more visual representations for rendering the selected data based on the one or more data points and the one or more data types using a mapping table generated based on a predetermined set of mapping criteria; and
visualize the selected data based on the one or more visual representations via the display device based on an identification of a type of the display device using a data rendering technique.

15. The system as claimed in claim 14, wherein the visualization engine comprises a data access unit executed by the processor, said data access unit configured to authenticate users to retrieve the selected data from an external data source.

16. The system as claimed in claim 14, wherein the visualization engine comprises a data analysis unit executed by the processor, said data analysis unit configured to identify the one or more data points and the one or more data types in the selected data using data analysis techniques by:
identifying a category of the selected data by analyzing and categorizing the selected data,
extracting one or more features from the selected data based on the identified category, wherein the one or more features are representative of measurements associated with the one or more data points to observe the selected data;
identifying the one or more data types of each of the one or more features using a datatype checker pipeline;
creating data structures by aligning the extracted features in columns; and
identifying the one or more data points associated with the selected data using data analysis techniques on the created data structures, wherein a pattern and correlation between the extracted features and the one or more datatypes is evaluated.

17. The system as claimed in claim 14, wherein the visual representations may be selected from graphs, charts, tables, maps, infographics, and dashboards.

18. The system as claimed in claim 14, wherein the type of display device is identified from virtual reality displays, augmented reality displays, mixed reality displays and smartphones.

19. The system as claimed in claim 14, wherein the visualization engine comprises a data rendering unit executed by the processor, said data rendering unit configured to visualize the selected data using the evaluated one or more visual representations via the display device using the data rendering technique, wherein the data rendering technique comprises:
evaluating one or more 3D objects for visualizing the evaluated one or more visual representations on identification of virtual reality display as the type of display device;
computing coordinates of the one or more 3D objects based on feature values associated with one or more features of the identified one or more data points;
evaluating a theme of the one or more 3D objects based on a real-time lighting information of a real world environment, wherein the theme is representative of color and texture; and
rendering the one or more 3D objects in the real world environment based on the computed coordinates and the evaluated theme, wherein the rendered one or more 3D objects are representative of visualized selected data.

20. The system as claimed in 19, wherein estimating the real-time lighting information of the real world environment comprises:
retrieving information associated with the real world environment via at least one of: a plurality of sensing devices and a one or more optical sensors of the display device, wherein one or more images of the real world environment are retrieved via at least on of: the plurality of sensing devices and the one or more optical sensors of the display device;
extracting a plurality of feature points from the retrieved images; and
estimating the real-time lighting information of the real world environment using pixel intensity of the extracted plurality of feature points based on a plurality of lighting parameters.

21. The system as claimed in claim 14, wherein the visualization engine comprises a data rendering unit executed by the processor, said data rendering unit configured to visualize the selected data based on the evaluated one or more visual representations via the display device using the data rendering technique, wherein one or more objects for visualizing the evaluated one or more visual representations are evaluated on identification of smartphone as the type of display device; further wherein coordinates of the one or more objects are computed based on feature values associated with one or more features of the identified one or more data points; and the one or more objects are rendered on the smartphone using the computed coordinates, wherein the rendered one or more objects are representative of visualized selected data.

22. The system as claimed in claim 14, wherein the visualization engine comprises an action identification unit executed by the processor, said action identification configured to analyse and modify the visualized data using user actions, wherein the user actions include hand gestures, touch inputs and voice commands, further wherein the user actions are customizable.

23. The system as claimed in claim 22, wherein the user actions are identified via a plurality of sensing devices, and the identified user actions are interpreted for analysis and modification of the visualized data using machine learning techniques.

24. The system as claimed in claim 22, wherein identification and interpretation of the hand gestures comprises:
retrieving image frames in real time via at least one of: a plurality of sensing devices and a one or more optical sensors of the display device;
processing and analyzing the retrieved image frames to detect hand gestures in the frames using a gesture recognition model;

interpreting inputs from the hand gestures in the frame using the gesture recognition model.

25. The system as claimed in claim 24, wherein the hand gestures include select, move, zoom in, zoom out, discard, and randomize.

26. The system as claimed in claim 22, wherein identification and interpretation of the voice commands comprises:
identifying speech input by processing and analyzing sound signals retrieved via at least one of: a plurality of sensing devices and a microphone of the display device;
converting the identified speech input into text using at least one of: a speech recognition machine learning model and a speech to text module of the display device;
interpreting the text using a voice interpretation machine learning model to identify user's intent.

27. A computer program product comprising:
a non-transitory computer-readable medium having computer-readable program code stored thereon, the computer-readable program code comprising instructions that, when executed by a processor, cause the processor to:
identify one or more data points and one or more data types associated with a selected data using data analysis techniques;
evaluate one or more visual representations for rendering the selected data based on the one or more data points and the one or more data types using a mapping table generated based on a predetermined set of mapping criteria; and
visualize the selected data based on the one or more visual representations via the display device based on an identification of a type of the display device using a data rendering technique.

28. The computer program product as claimed in claim 27, wherein the visualized data is analysed and modified using user actions, wherein the user actions include hand gestures, touch inputs and voice commands, further wherein the user actions are customizable.

* * * * *